(12) United States Patent  
Muerb (10) Patent No.: US 7,008,203 B2
(45) Date of Patent: Mar. 7, 2006

(54) DEVICE FOR GRANULATING A THERMOPLASTIC, WHICH IS EXTRUDED FROM NOZZLES

(75) Inventor: Reinhardt-Karsten Muerb, Aschaffenburg (DE)

(73) Assignee: Rieter Automatik GmbH, (DE)

( * ) Notice: Subject to any disclaimer, the term of this patent is extended or adjusted under 35 U.S.C. 154(b) by 0 days.

(21) Appl. No.: 10/485,363

(22) PCT Filed: Jul. 23, 2002

(86) PCT No.: PCT/EP02/08209

§ 371 (c)(1),
(2), (4) Date: Jul. 21, 2004

(87) PCT Pub. No.: WO03/011548

PCT Pub. Date: Feb. 13, 2003

(65) Prior Publication Data

US 2004/0241269 A1    Dec. 2, 2004

(30) Foreign Application Priority Data

Aug. 1, 2001   (DE) ............................. 101 37 524

(51) Int. Cl.
*B29B 9/06*    (2006.01)

(52) U.S. Cl. ........................... 425/67; 425/69; 425/70; 425/313; 425/DIG. 230; 425/377; 425/378.1; 425/382 R (58) Field of Classification Search ................ 425/67, 425/69, 70, 313, DIG. 230, 308, 310, 311, 425/377, 464, 378.1, 382 R, 382.3
See application file for complete search history.

(56) References Cited

U.S. PATENT DOCUMENTS

| | | | |
|---|---|---|---|
| 423,207 A | 3/1890 | Bauer | |
| 2,850,764 A * | 9/1958 | Evans et al. | ................. 264/143 |
| 3,317,957 A | 5/1967 | Heston et al. | |
| 3,324,510 A | 6/1967 | Kleeb | ........................ 425/310 |
| 3,337,913 A * | 8/1967 | List | ............................ 425/92 |
| 4,300,877 A * | 11/1981 | Andersen | ..................... 425/67 |
| 4,978,288 A * | 12/1990 | Ellwood | ..................... 425/311 |

FOREIGN PATENT DOCUMENTS

| | | |
|---|---|---|
| DE | 1 037 116 | 8/1958 |
| DE | 198 42 389 C 1 | 1/2000 |
| FR | 1449787 | 5/1966 |
| WO | WO 01/21371 A1 | 3/2001 |

\* cited by examiner

*Primary Examiner*—Joseph S. Del Sole
(74) *Attorney, Agent, or Firm*—Banner & Witcoff, Ltd.

(57) ABSTRACT

The present invention relates to a device for granulating thermoplastic materials issuing from orifices, said orifices being provided in a substantially circular arrangement in an orifice plate and being swept by blades rotating about a blade carrier shaft, said blades being held by a blade carrier in an oblique position with respect to the radial direction, the blade carrier shaft extending through the centre of the circular arrangement and a cooling medium being supplied to the orifice plate and to the blades for cooling the granulated plastic materials.

6 Claims, 7 Drawing Sheets

DEVICE FOR GRANULATING A THERMOPLASTIC, WHICH IS EXTRUDED FROM NOZZLES

This application is a National Stage application of co-pending PCT application PCT/EP02/08209 filed 23 Jul., 2002, which claims the benefit of German application Ser. No. 101 37 524.7 filed 1 Aug., 2001. These applications are incorporated herein by reference in their entireties.

The invention relates to a device for granulating thermoplastic materials issuing from orifices, said orifices being provided in a substantially circular arrangement in an orifice plate and being swept by blades rotating about a blade carrier shaft, said blades being held by a blade carrier in an oblique position with respect to the radial direction, the blade carrier shaft extending through the centre of the circular arrangement and a cooling medium being supplied to the orifice plate and to the blades for cooling the granulated plastic materials. This is, therefore, a device for so-called hot-melt granulation in which the plastic extrudate issuing from the orifices is cut directly at the orifices, i.e. while still in the molten state.

Such a device is presented in U.S. Pat. No. 3,317,957. The special feature of this known device consists in the fact that the cooling medium is supplied from the same side as the molten thermoplastic material, said cooling medium being supplied via channels which extend parallel to the blade carrier shaft and which lie radially within the circular arrangement of the orifices. The blade carrier is driven likewise from the same side from which the plastic melt is supplied, with the result that the entire arrangement with the supplies for the plastic melt and the cooling medium is penetrated by the drive shaft, which becomes the blade carrier shaft. This results in a complex construction, particularly because of the required sealing means, wherein, owing to the limited space available for the supply channels for the cooling medium, said supply channels are formed with relatively small cross section, the consequence of this being that it is necessary to apply considerable pressures in order to conduct the necessary quantity of cooling medium.

Consequently, a different approach has also been adopted for cooling the granulate produced by the hot melt process, namely to accommodate the blades with blade carrier in the interior of an enclosed housing, one wall of which housing is a plate containing the orifice plate, the coolant being supplied and removed in the interior in such a manner that the corresponding lines are directed towards the shaft of the blade carrier. This leads, with the rotation of the blade carrier, to considerable turbulence of the cooling water together with the granulate in the said interior, there resulting completely uncontrollable flows which, owing to the thereby caused turbulence, facilitate the subsequent agglomeration of the granulate. Examples of this type of cooling water supply and removal are presented in U.S. Pat. No. 423,207 and DE-OS 198 42 389.

The object of the invention is from the outset to provide the flow of cooling medium in the device with a path which allows a uniform flow largely free from turbulence.

The object of the invention is achieved in that the blade carrier is disposed with the blade carrier shaft in a substantially round housing extending as far as the orifice plate, a coolant inlet joining into the housing in the tangential direction for producing an annular flow, the blade carrier rotating in the housing, the cooling medium rotating in the housing substantially with a velocity and direction of rotation corresponding to the rotational velocity and direction of rotation of flow openings in the blade carrier, through which flow openings the cooling medium reaches the blades.

With this design, the cooling medium is supplied through the tangential alignment of the cooling medium inlet in such a manner that there results, in the substantially round housing, an annular flow from which, via flow openings in the blade carrier which rotates in the housing, the cooling medium is then able to be supplied to the blades, the rotational velocity of the annular flow readily permitting said velocity to be adapted to the rotational velocity and direction of rotation of the flow openings in the blade carrier. The cooling medium is thus diverted from the annular flow in the housing through openings in the blade carrier, said openings rotating with the same velocity, and can thereafter, on emerging from the flow openings, be supplied to the blades in a new annular flow, the blades likewise rotating, the overall result being a flow which is everywhere in rotation and which, consequently, owing to the resultant uniformity, permits the reliable turbulence-free conveying-away of the granulate.

Advantageously, after flowing through the region of the rotating blades, the cooling medium is removed from the housing via a likewise tangential coolant outlet leading away from the blades, the granulate also being conveyed away.

The housing is advantageously provided in the region of the blades with a wall surrounding the blades, said wall in spiral manner widening the space between the blades and the wall in the flow direction of the cooling medium such that, in said space, the flow velocity of the cooling medium remains virtually constant. This design results in a space between the blade-carrying region of the blade carrier and the wall, said space becoming uniformly wider in the direction of rotation of the blade carrier, with the consequence that, in said region, as the diameter of said space increases, the flow velocity of the cooling water remains virtually constant, this being important for the turbulence-free flowing of the cooling water, which consequently conveys away the granulate after cutting with corresponding uniformity via the coolant outlet.

So that the operation of the device can be constantly monitored from outside, the housing may consist at least partially of a transparent material, particularly plexi-glass.

The device is made easy to repair if the housing is divided into two housing parts separably joined in the region of the blades.

An advantageous arrangement of the motor serving to drive the blade carriers results if said motor is disposed on the side facing away from the orifice plate. In this case, the motor does not disturb the design of a melt distributor, from which the orifices receive their melt.

Illustrative embodiments of the invention are presented in the drawings, in which.

Figure 1A:
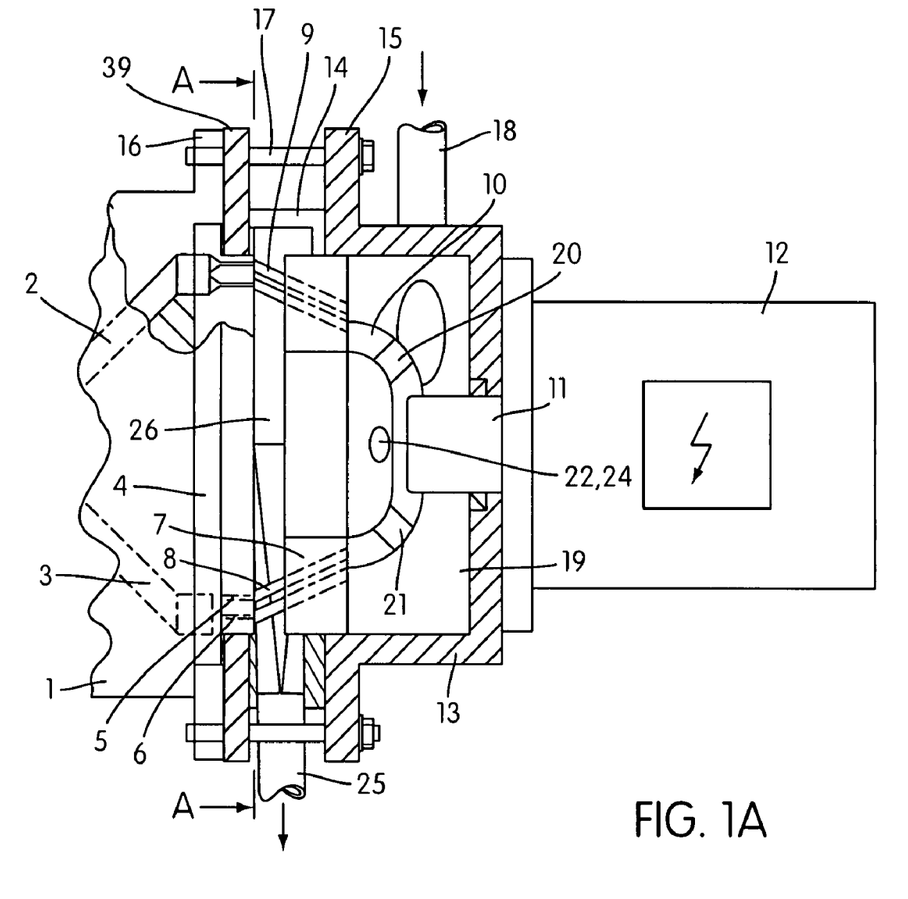
FIG. 1A shows the overall device in section.

FIG. 1A shows a section through the device according to the invention, wherein those components not belonging to the invention, namely an extruder for supplying a molten plastic material, have been omitted. The device contains the melt distributor 1, which is used in known manner and comprises a plurality of melt channels, here the two channels 2 and 3. Flanged onto the melt distributor 1 by means of attachment means (not shown here) is the orifice plate 4 into which the melt channels 2 and 3 join, becoming the orifices 5 and 6. During operation, the thermoplastic material to be granulated issues in molten form from the orifices 5 and 6. The orifice plate 4 comprises further orifices, the circular arrangement of which is apparent from FIG. 10. Disposed opposite the orifice plate 4 is the annular plate 7 from which the blades 8 and 9 (and further blades not shown) project and in known manner sweep the surface of the orifice plate 4 facing the annular plate 7, chopping the thermoplastic extrudate issuing from the orifices 5 and 6. With regard to the arrangement and support of the blades 8 and 9 in the annular plate 7, reference is made to the explanatory remarks in respect of FIG. 4 to 6. The annular plate 7 is attached to the bell-shaped blade carrier 10 which is situated at the end of the blade carrier shaft 11, said blade carrier shaft 11 joining into the drive motor 12 (shown only in outline). Through the intermediary of the blade carrier shaft 11, the drive motor 12 sets the blade carrier 10 and thus the annular plate 7 with the blades 8 and 9 in rotation, the supplied thermoplastic extrudate being granulated, as described above.

Figure 2:
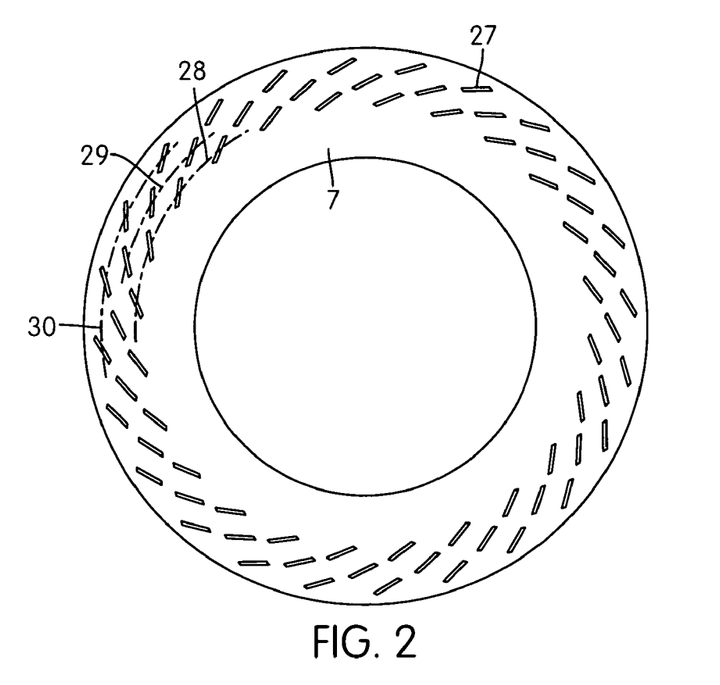
FIG. 2 shows a top plan view of the annular plate penetrated by slots for holding the strip-like blades for three circular arrangements of blades.

The internal parts of the said device are enclosed by the housing 13, which continues into the cover 14 extending over the region of the orifices 5 and 6 and of the blades 8 and 9. The two associated regions of plastic supply and granulation are held together by the flange-like shoulders 15 of the housing 13 and 16 of the melt distributor 1, this being accomplished by means of screws 17 which, when tightened, provide firm enclosing of the cover 14, whereby the entirety of the device, through the housing consisting of the parts 13 and 14, extends into the region of the melt distributor 1. As shown in FIG. 2, which will be discussed in greater detail below, the device according to FIG. 1 is substantially rotationally symmetrical; that is, the housing 13 with the cover 14 substantially has a circular surface on the outside. The mounting 39 provides the orifice plate 4 with the requisite centering.

The cover 14 belonging to the housing 13 is here formed of plexiglass, which, because of its transparency, makes it possible to observe what is happening in the region in which granulation takes place.

For the cooling of the granulate cut by the blades 8 and 9, the housing 13 and the region in which granulation takes place are supplied with a cooling medium, which, in this case, is cooling water, the cooling water being supplied through the coolant inlet 18. The coolant inlet 18 joins virtually tangentially into the interior 19 of the housing 13, this resulting in the housing 13 in a rotational flow, the rotational velocity of which can be adjusted by the volume of water supplied. The cooling water passes from the interior 19 via the flow openings 20, 21 and 22 into the hollow space 24 of the bell-shaped blade carrier 10. The blade carrier 10 rotates at the rotational velocity imparted to it by the drive motor 12. In order to supply the cooling water via the flow openings 20, 21 and 22 to the hollow space 24 in the blade carrier 10 in such a manner that the cooling water rotating in the interior 19 is able to flow out in largely turbulence-free manner into the flow opening 20, 21 and 22, the rate of supply of the cooling water and thus the rotational velocity of the cooling water in the interior 19 is regulated in such a manner that the cooling water in the interior 19 in the region of the flow openings 20, 21 and 22 circulates at the same rotational velocity as the flow openings 20, 21 and 22 rotate. This avoids losses of energy at this point as a result of different rotational velocities. This manner of adaptation of the rotational velocities is made possible by the tangential supply of the cooling water via the coolant inlet 18.

As can be seen, the hollow space 24 of the blade carrier 10 is in direct communication with the blades 8 and 9 as well as with the region of the orifice plate 4, because the bell-shaped blade carrier 10 is open towards the orifice plate 4, with the result that the cooling water entering the hollow space 24 of the blade carrier 10 is able to flow out past the blades 8 and 9 and over the surface of the orifice plate 4 to the outside. Such outflow is facilitated by the likewise tangentially disposed coolant outlet 25, which leads out of the intermediate space 26 between the orifice plate 4 and the annular plate 7. In the said intermediate space, the cooling water circulates owing to the rotation of the blade carrier 10 and of the blades 8 and 9, this circulation being in a direction which transitions directly into the tangential direction according to the coolant outlet 25. This, therefore, creates for the entire throughflow of the cooling water a direction and a transition from region to region which opposes the least possible resistance to the coolant throughflow and consequently has a correspondingly energy-reducing effect with regard to the drive motor 12.

Figure 1B:
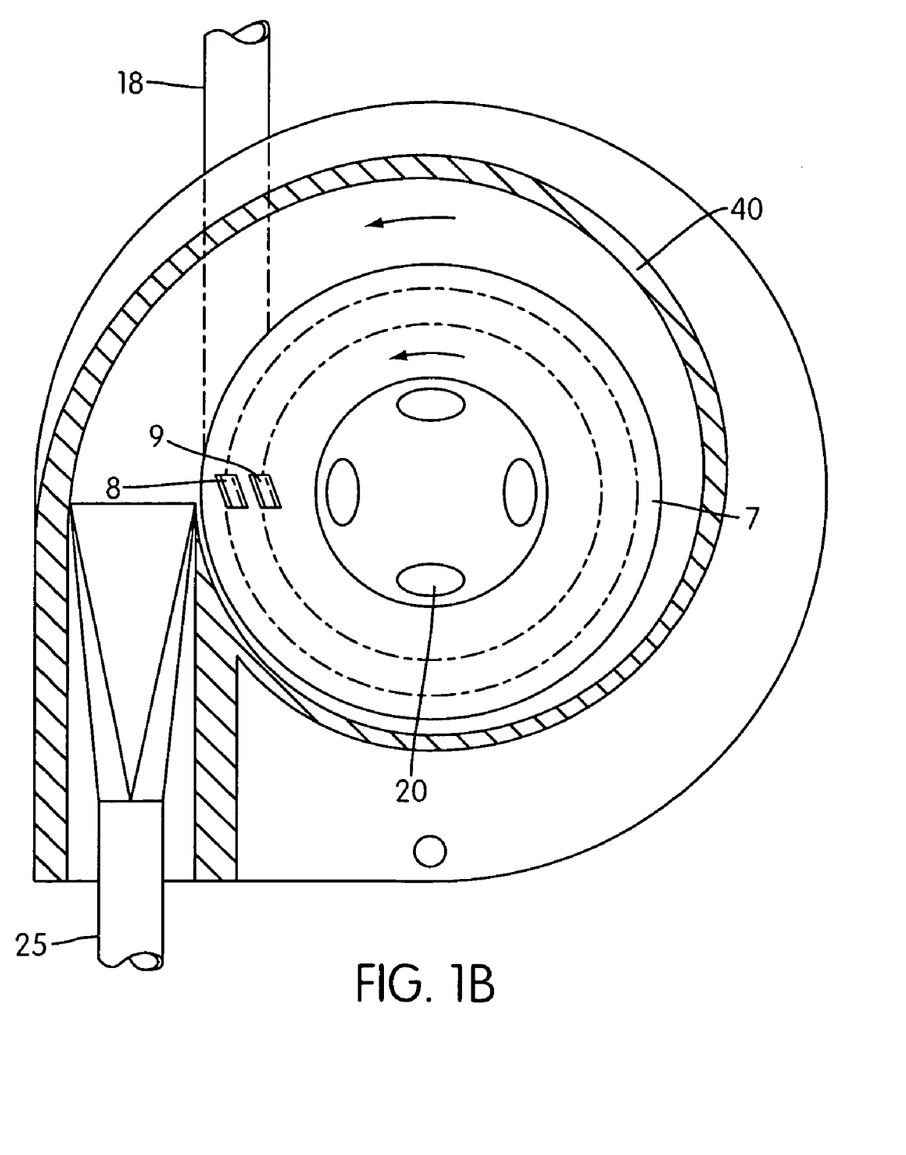
FIG. 1B shows a section on the line A—A from FIG. 1.

FIG. 1B shows a section on the line A—A from FIG. 1A. This section, therefore, extends along the side of the orifice plate 4 facing the blades. This results in FIG. 1B in a top plan view of the annular plate 7 with the blades 8 and 9. The annular plate 7 is held by the blade carrier 10, in which the flow openings 20, 21 and 22 are provided (the fourth flow opening is not visible in FIG. 1). FIG. 1B additionally shows the cover 14, which extends from the point of the coolant outlet 25 in the form of a spiral around the annular plate 7, the space between the annular plate 7 containing the blades 8 and 9 and the outer wall of the cover 14 steadily becoming smaller and, conversely, steadily becoming wider in the flow direction (see arrow), with the result that, in this region, with increasing diameter of the said space, the flow velocity of the cooling water remains virtually constant, this being important for the turbulence-free flowing of the cooling water, which consequently conveys away the granulate after cutting with corresponding uniformity via the coolant outlet.

FIG. 2 shows the annular plate 7, attached to the blade carrier, alone without blades; more specifically, it shows a top plan view of the side on which the blades emerge. Thus, FIG. 2 shows the openings of the individual penetrations 27 into which the individual blades are inserted, as will be more fully explained below. FIG. 2 shows an annular plate with three circular arrangements 28, 29, 30.

Figure 3:
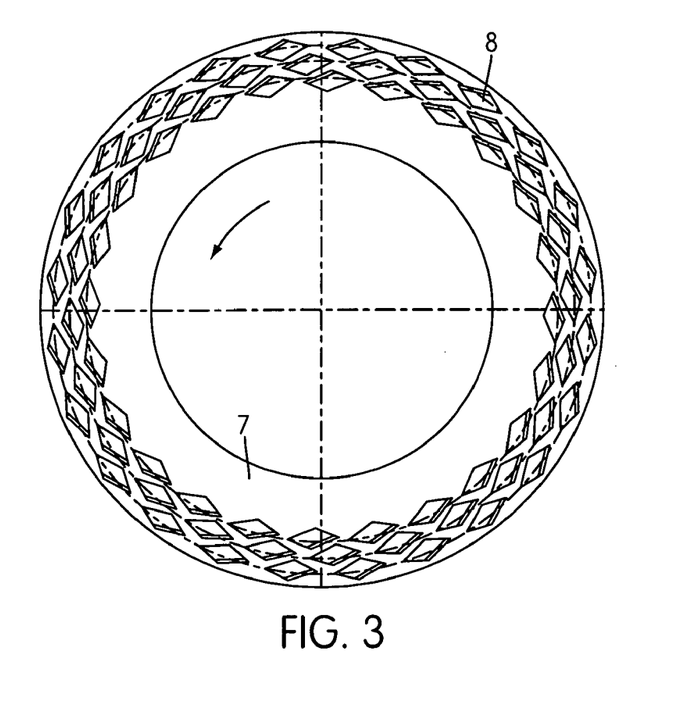
FIG. 3 shows the same annular plate with blades inserted in the penetrations.

FIG. 3 shows the same annular plate 7; this time, however, a blade 8 is inserted into each of the penetrations 27. As can be seen, said blades 8 project from the penetrations 27 obliquely with respect to the surface of the annular plate 7 and at an angle with respect to the direction of rotation. The blades 8 are obliquely positioned with regard to the direction of rotation, said oblique position being so selected that, owing to the oblique position, as the annular plate rotates there is only a low flow resistance with respect to the resulting flow of the cooling water. Namely, the cooling water flows from inside to outside (see explanation with regard to FIG. 1A), the flow of the cooling water not extending directly radially outwards, but in the form of a spiral. The oblique position of each of the blades 8 is adapted to the respective angle of said spiral, with the result that the blades 8 oppose only a low flow resistance to the cooling water as it passes. The direction of rotation of the annular plate 7 is indicated by the arrow.

Figure 4:
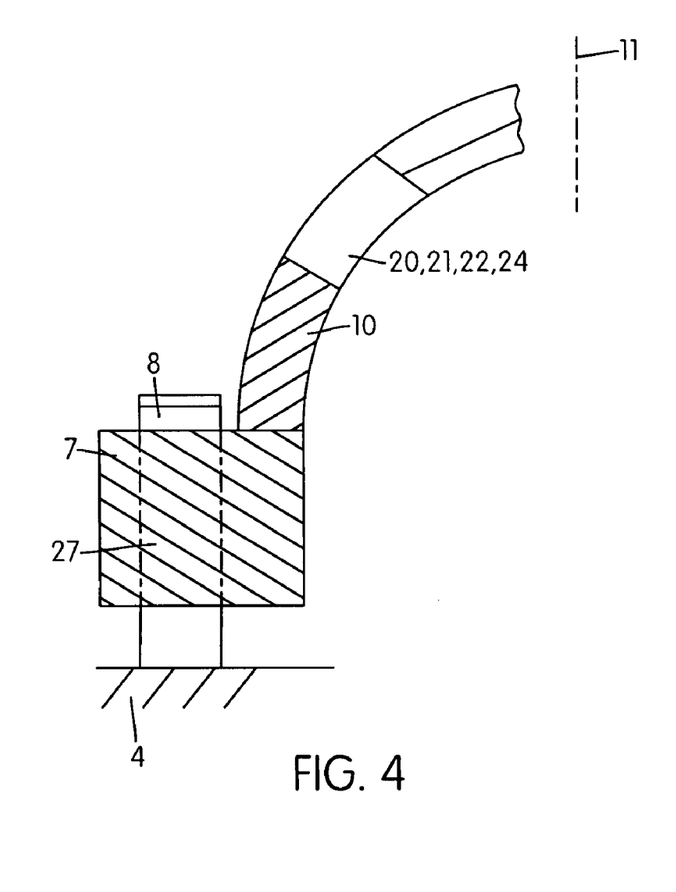
FIG. 4 shows a schematic representation of an annular plate with a blade as its sweeps the orifice plate.

FIG. 4 is a schematic representation of the arrangement of a blade 8 with regard to the orifice plate 4 with the orifice 5. The blade 8 is inserted in a penetration 27 in the annular plate 7 and is attached therein, as will be explained hereinbelow. The orifice plate becomes the bell-shaped blade carrier 10, which is attached to the blade carrier shaft 11 indicated by the dash-dotted line.

Figure 5:
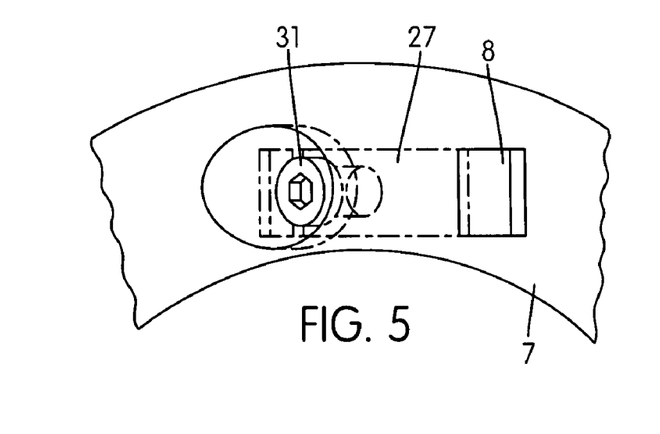
FIG. 5 shows the arrangement according to FIG. 4 in a top plan view.

FIG. 5 shows a top plan view of the region of the annular plate 7 shown with the blade 8 in FIG. 4, the blade 8 projecting from the annular plate 7. The blade 8 is inserted in the penetration 27 indicated by the dash-dotted lines. The blade 8 is attached to the annular plate 7 by the screw 31.

Figure 6:
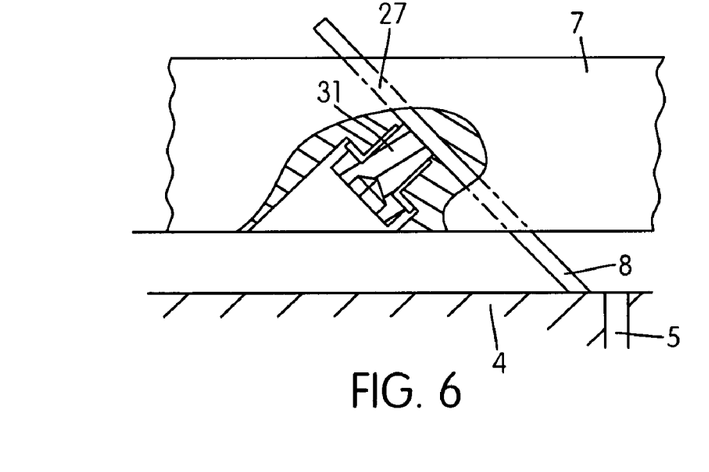
FIG. 6 shows the attachment of the blade in the penetration in the annular plate.

FIG. 6 shows the representation from FIG. 5 in a side view, this making it apparent how the blade is inserted into the blade carrier 7, i.e. into the penetration 27 provided for this purpose. The screw 31 then clamps the blade 8 in the penetration.

Figure 7:
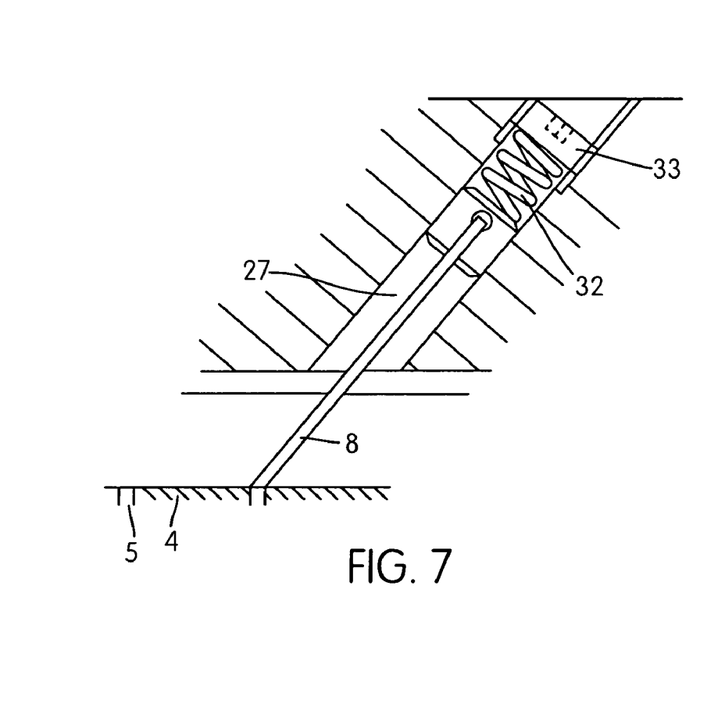
FIG. 7 shows a detail of the annular plate with a spring-loaded blade.

Similarly to FIG. 6, FIG. 7 shows a portion of the annular plate 7 with the penetration 27 into which the blade 8 has been inserted. Here, the blade 8 terminates in the central region of the annular plate 7, where the rear side of the blade 8 contacts the helical spring 32, said helical spring 32 being supported against an abutment 33. The helical spring 32 presses against the blades 8, said blades 8 being displaceably and therefore adjustably held in the annular plate 7 and consequently being in constant contact with the orifice plate 4 with a corresponding pressure. As the blade 8 wears and thereby becomes shorter, the helical spring 32 automatically presses the blade further in the direction of the orifice plate 4, this fully compensating for the wear which has taken place.

Figure 8:
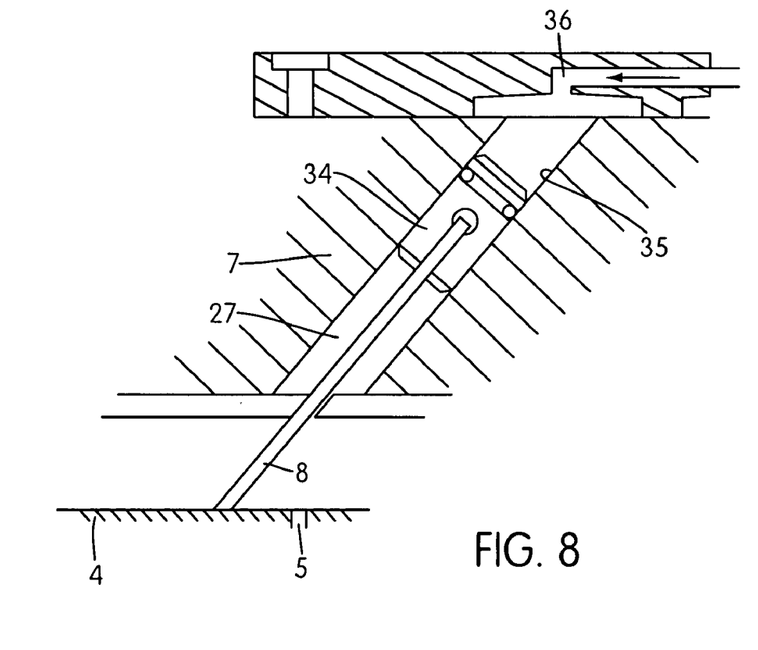
FIG. 8 shows a variant of the arrangement according to FIG. 7 in which the blade is pressed by a hydraulically actuated piston.

FIG. 8 shows a variant of the arrangement from FIG. 7 in which the rear side of the blade 8 is held in a piston 34 which is guided in a corresponding bore 35. The bore 35 is, as it were, a continuation of the penetration 27 towards the rear side of the orifice plate 4. The piston 34 is subjected to a pressure exerted either by a fluid or by a gas, said pressure being supplied through a special channel 36 of the bore 35. In this case, therefore, the wear on the blade 8 is compensated in the same manner as described above in connection with FIG. 7.

Figure 9:
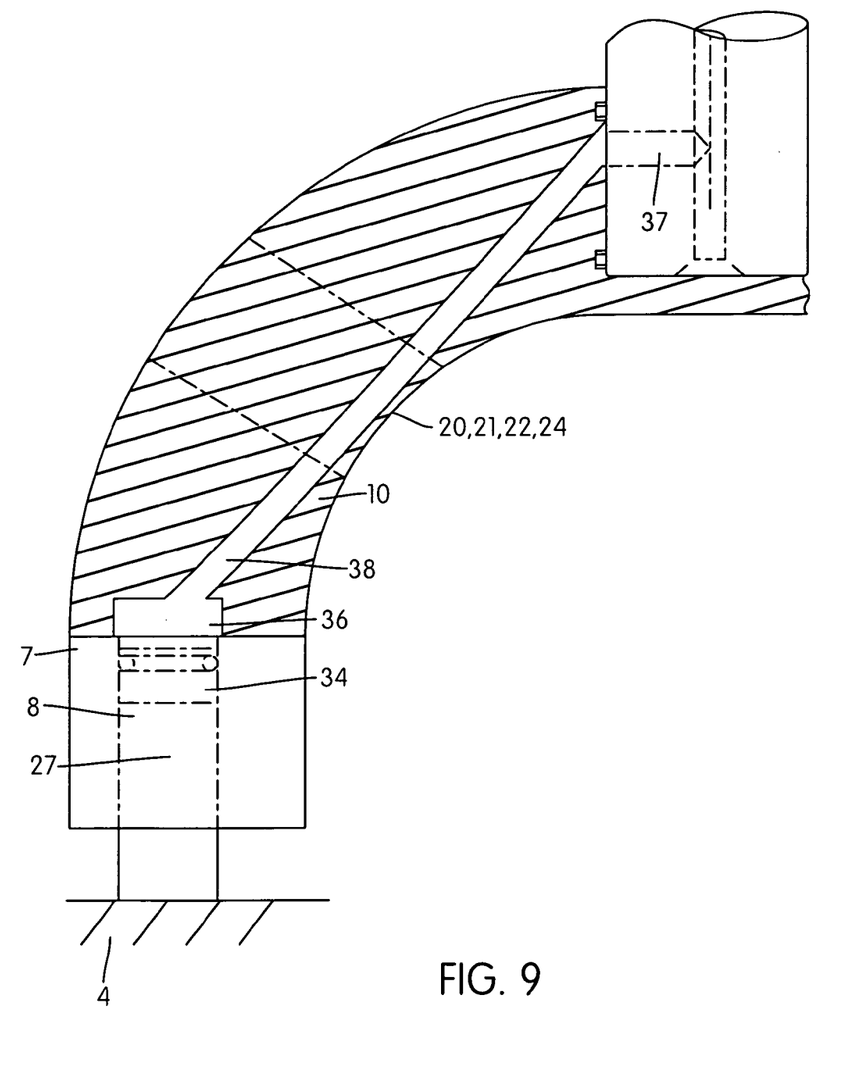
FIG. 9 shows the supply of a hydraulic fluid through the blade carrier shaft as far as the annular plate.

FIG. 9 is a schematic representation of the supply of a pressure medium of the kind required in the arrangement shown in FIG. 8. In this case, the pressure medium passes via the blade carrier shaft 10 into a central distributor 37, from where, via a bore 38, the pressure medium passes via the blade carrier 10 into the annular plate 7.

Figure 10:
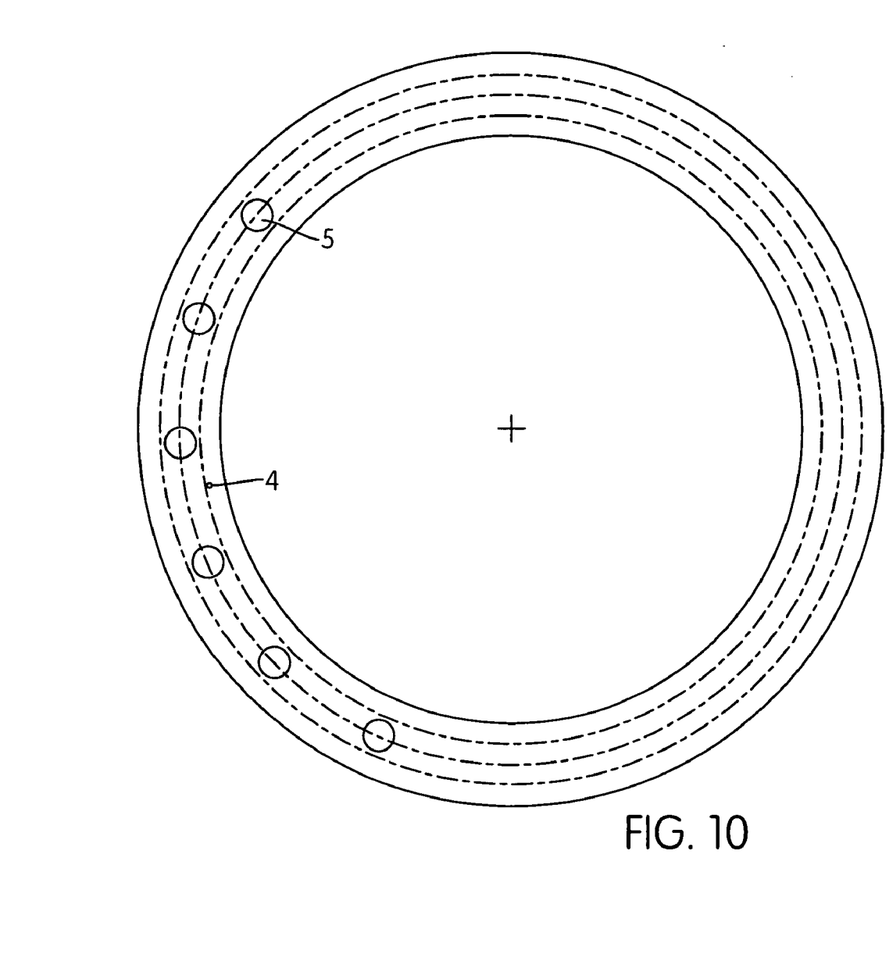
FIG. 10 shows a top plan view of the orifice plate with a single annular arrangement of orifices.

FIG. 10 shows the orifice plate 4, said orifice plate 4 in this case being provided with only one circular arrangement of orifices 4, 5. The orifices 4, 5 are formed by bores with circular cross-sections of identical diameter and are swept by the blade 8, as will be explained with reference to FIG. 11.

Figure 11:
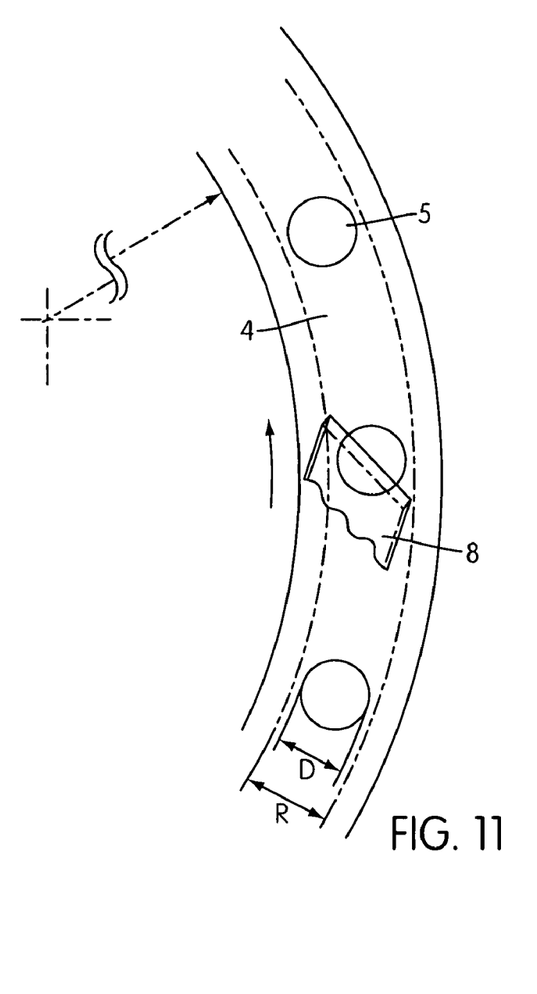
FIG. 11 shows an enlarged representation of some orifices according to FIG. 10 showing a blade which just exceeds the diameter of the orifices in the radial direction.

FIG. 11 shows a portion of the orifice plate 4 with three orifices 5 as well as the blade 8, which is disposed obliquely with respect to the radial direction. The radial extent R of the blade 8 is shown in FIG. 11. As can be seen, the radial extent R is slightly greater than the diameter D of the orifices 5. The consequence of this is that the blades 8 are just sufficient to cut through the plastic melt supplied via the orifices 5, the granules being cut individually and independently from each other because the radial extent R of the blades is only slightly greater than the diameter D, with the consequence that, as the blades 8 rotate, they encounter only a minimal resistance with respect to the flow of the cooling water.

What is claimed is:

1. Device for granulating thermoplastic materials issuing from orifices (5, 6), said orifices (5, 6) being provided in a substantially circular arrangement in an orifice plate (4) and being swept by blades (8, 9) rotating about a blade carrier shaft (11), said blades (8, 9) being held by a blade carrier (10, 7) in an oblique position with respect to the radial direction, the blade carrier shaft (11) extending centrally of the circular arrangement, the blade carrier (10, 7) being provided in a housing having an essentially round cavity with the blade carrier shaft (11), the housing (13) extending up to the orifice plate (4), and a cooling medium being supplied to the orifice plate (4) and to the blades (8, 9) for cooling the granulated plastic materials, characterized in that a coolant inlet (18) joins into the housing (13) in a generally tangential direction relative to the round cavity for producing an annular flow in the cavity, the housing (13) being penetrated by the blade carrier shaft (11) from a side of the blade carrier (10, 7) directed away from the orifice plate (4), whereby the cooling medium rotates in the housing (13) substantially with a velocity and direction of rotation corresponding to the rotational velocity and direction of rotation of flow openings (20) in the blade carrier (10), through which flow openings (20) the cooling medium reaches the blades (8, 9).

2. Device according to claim 1, characterized in that the cooling medium is conveyed away together with the granulate via a coolant outlet (25) leading tangentially away from the blades (8, 9) and penetrating the housing (13).

3. Device according to claim 1 or 2, characterized in that, in the region of the blades (8, 9), the housing (13) has a wall (40) surrounding the blades (8, 9), said wall (40) in spiral manner widening the space between the blades (8, 9) and the wall (40) in the flow direction of the cooling medium such that, in said space, the flow velocity of the cooling medium remains virtually constant.

4. Device according to claim 1 or 2, characterized in that housing (13) consists at least partially of a transparent material, particularly plexiglass.

5. Device according to claim 1 or 2, characterized in that the housing (13) comprises two housing parts separably joined in the region of the blades (8, 9).

6. Device according to claim 1 or 2, characterized in that a motor (12) serving to drive the blade carrier shaft (11) is disposed on the side facing away from the orifice plate (4).

* * * * *

UNITED STATES PATENT AND TRADEMARK OFFICE
CERTIFICATE OF CORRECTION

PATENT NO. : 7,008,203 B2
APPLICATION NO. : 10/485363
DATED : March 7, 2006
INVENTOR(S) : Reinhardt-Karsten Muerb It is certified that error appears in the above-identified patent and that said Letters Patent is hereby corrected as shown below:

On the cover page, Title Item (54):
Please replace "DEVICE FOR GRANULATING A THERMOPLASTIC, WHICH IS EXTRUDED FROM NOZZLES" with --DEVICE FOR GRANULATING THERMOPLASTIC MATERIAL ISSUING FROM ORIFICES--

Signed and Sealed this

Fifteenth Day of August, 2006

JON W. DUDAS
*Director of the United States Patent and Trademark Office*